(12) United States Patent
Johnson et al.

(10) Patent No.: US 8,200,872 B2
(45) Date of Patent: Jun. 12, 2012

(54) METHOD FOR DETERMINISTIC SAS DISCOVERY AND CONFIGURATION

(75) Inventors: Steve Johnson, Colorado Springs, CO (US); Owen Parry, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 51 days.

(21) Appl. No.: 12/946,231

(22) Filed: Nov. 15, 2010

(65) Prior Publication Data

US 2012/0124256 A1    May 17, 2012

(51) Int. Cl.
*G06F 13/00* (2006.01)
(52) U.S. Cl. .......... 710/104; 710/15; 710/300; 710/305; 370/254; 370/389
(58) Field of Classification Search ............. 710/15, 710/104, 300, 305; 370/254, 389
See application file for complete search history.

(56) References Cited

U.S. PATENT DOCUMENTS

| | | | |
|---|---|---|---|
| 7,401,171 B2 * | 7/2008 | Slutz et al. ............. | 710/104 |
| 7,673,185 B2 | 3/2010 | Kalwitz et al. | |
| 7,738,397 B2 * | 6/2010 | Clayton ............. | 370/254 |
| 7,787,452 B2 * | 8/2010 | Jones ............. | 370/389 |
| 7,917,665 B1 * | 3/2011 | Booth et al. ............. | 710/15 |
| 8,051,436 B2 * | 11/2011 | Jones ............. | 719/326 |
| 8,089,902 B1 * | 1/2012 | Liao et al. ............. | 370/254 |
| 2005/0138221 A1 * | 6/2005 | Marushak ............. | 710/1 |
| 2011/0219158 A1 * | 9/2011 | Davis et al. ............. | 710/300 |

OTHER PUBLICATIONS

HP—"Serial Attached SCSI Management upper layers and port layers"; 62 pages, Dated Sep. 30, 2003.*
Seagate—"Product Manual—Serial Attached SCSI (SAS)"; 252 pages, Dated Dec. 2009.*

* cited by examiner

*Primary Examiner* — Brian Misiura
(74) *Attorney, Agent, or Firm* — Suiter Swantz pc llo

(57) ABSTRACT

The present invention is directed to a method for deterministic Serial Attached Small Computer System Interface (SAS) discovery and configuration. The method includes transmitting a Serial Management Protocol (SMP) DISCOVER Request from a node of a SAS domain to each expander of the SAS domain. The method further includes receiving SMP DISCOVER Responses at the node from each expander of the SAS domain. The method further includes comparing BROADCAST (CHANGE) RECEIVED (BCR) counts provided in each of the received SMP DISCOVER Responses to stored BCR counts, said stored BCR counts having been recorded and stored by the node prior to said transmitting of said SMP DISCOVER Request. The method further includes updating the stored BCR counts based upon said received BCR counts. The method further includes selectively transmitting a second SMP DISCOVER Request from the node to at least one, but not all of the expanders of the SAS domain.

22 Claims, 4 Drawing Sheets

METHOD FOR DETERMINISTIC SAS DISCOVERY AND CONFIGURATION

FIELD OF THE INVENTION

The present invention relates to the field of data management via data storage systems and particularly to a method for deterministic Serial Attached Small Computer System Interface (SAS) discovery and configuration.

BACKGROUND OF THE INVENTION

Currently available methods for providing SAS discovery in as SAS domain may not provide a desired level of performance.

Therefore, it may be desirable to provide a method(s) for providing SAS discovery in as SAS domain which addresses the above-referenced shortcomings of currently available solutions.

SUMMARY OF THE INVENTION

Accordingly, an embodiment of the present disclosure is directed to a method for performing SAS discovery in a SAS domain, said method including: transmitting a SMP DISCOVER Request from a node of the SAS domain to each expander included in a plurality of expanders of the SAS domain; receiving SMP DISCOVER Responses at the node from each expander included in the plurality of expanders of the SAS domain, said SMP DISCOVER Responses being responsive to said SMP DISCOVER Request; comparing BCR counts provided in each of the received SMP DISCOVER Responses to stored BCR counts, said stored BCR counts having been recorded and stored by the node prior to said transmitting of said SMP DISCOVER Request; updating the stored BCR counts based upon said received BCR counts; optimizing an SAS discovery algorithm of the node based upon said comparing; based upon said comparing, bypassing a first expander included in the plurality of expanders; and based upon said comparing, transmitting a second SMP DISCOVER Request from the node to a second expander included in the plurality of expanders, wherein said node is one of: an initiator and a self-configuring expander, wherein the BCR counts provided in the received SMP DISCOVER Responses indicate a number of BROADCAST (CHANGE) primitives received by each PHY of the expanders, wherein each expander increments its BCR count upon receiving a BROADCAST (CHANGE) primitive from a remote device of the SAS domain.

A further embodiment of the present disclosure is directed to a non-transitory, computer-readable medium having computer-executable instructions for performing a method for SAS discovery in a SAS domain, said method including: transmitting a SMP DISCOVER Request from a node of the SAS domain to each expander included in a plurality of expanders of the SAS domain; receiving SMP DISCOVER Responses at the node from each expander included in the plurality of expanders of the SAS domain, said SMP DISCOVER Responses being responsive to said SMP DISCOVER Request; comparing BCR counts provided in each of the received SMP DISCOVER Responses to stored BCR counts, said stored BCR counts having been recorded and stored by the node prior to said transmitting of said SMP DISCOVER Request; updating the stored BCR counts based upon said received BCR counts; optimizing an SAS discovery algorithm of the node based upon said comparing; based upon said comparing, bypassing a first expander included in the plurality of expanders; and based upon said comparing, transmitting a second SMP DISCOVER Request from the node to a second expander included in the plurality of expanders, wherein said node is one of: an initiator and a self-configuring expander, wherein the BCR counts provided in the received SMP DISCOVER Responses indicate a number of BROADCAST (CHANGE) primitives received by each PHY of the expanders, wherein each expander increments its BCR count upon receiving a BROADCAST (CHANGE) primitive from a remote device of the SAS domain.

A still further embodiment of the present disclosure is directed to a SAS discovery initiating node of a SAS domain, said node including: an interface, said interface configured for communicatively coupling the node to a plurality of expanders of the SAS domain; a memory, said memory configured for storing a plurality of BCR counts; and a microprocessor, said microprocessor being connected to the memory and the interface, said microprocessor configured for causing the node to transmit a first SMP DISCOVER Request to each expander included in the plurality of expanders of the SAS domain when a BROADCAST (CHANGE) primitive is received by the node from an expander included in a plurality of expanders of the SAS domain, said node being further configured for receiving, via the interface, a plurality of SMP DISCOVER Responses, said plurality of SMP DISCOVER Responses being sent from the plurality of expanders of the SAS domain, said SMP DISCOVER Responses being responsive to said first SMP DISCOVER Request, said node being further configured for comparing BCR counts provided in each of the received SMP DISCOVER Responses to the stored BCR counts, said stored BCR counts having been recorded and stored by the node prior to said transmitting of said first SMP DISCOVER Request, wherein said node updates the stored BCR counts based upon said received BCR counts, wherein said node is configured for optimizing an SAS discovery algorithm of the node based upon said comparing of the received BCR counts to the previously recorded BCR counts, wherein, based upon said comparing, said node is configured for bypassing a first expander included in the plurality of expanders, wherein, based upon said comparing, said node is configured for transmitting a second SMP DISCOVER Request to a second expander included in the plurality of expanders, wherein said node is one of: an initiator and a self-configuring expander, wherein the BCR counts provided in the received SMP DISCOVER Responses indicate a number of BROADCAST (CHANGE) primitives received by each PHY of the expanders, wherein each expander increments its BCR count upon receiving a BROADCAST (CHANGE) primitive from a remote device of the SAS domain.

A further embodiment of the present disclosure is directed to a SAS expander, said SAS expander including: an interface, said interface configured for connecting the expander to a plurality of SAS devices of a SAS domain, said interface including a plurality of SAS PHYs; a memory, said memory configured for storing a plurality of BCR counters of the SAS expander, each BCR counter included in the plurality of BCR counters corresponding to a SAS PHY included in the plurality of SAS PHYs, each BCR counter configured for indicating a number of BROADCAST (CHANGE) primitives received by its corresponding SAS PHY; and a microprocessor, said microprocessor being connected to the memory and to the interface, said microprocessor configured for monitoring when a BROADCAST (CHANGE) primitive is received by a SAS PHY included in the plurality of SAS PHYs of the SAS expander, said microprocessor further configured for recording in the plurality of BCR counters a number of BROAD- CAST (CHANGE) primitives received by each of the corresponding SAS PHYs of the SAS expander, said microprocessor configured for causing said counters to be incremented by one for each BROADCAST (CHANGE) primitive received by their corresponding PHYs, said microprocessor configured for receiving, via the interface, a SMP DISCOVER Request from a SAS discovery initiating node included in the plurality of SAS devices of the SAS domain, said microprocessor further configured for causing the SAS expander to transmit to the SAS discovery initiating node, via the interface, a SMP DISCOVER Response responsive to said SMP DISCOVER Request, wherein said SMP DISCOVER Response includes BCR counts of each of the BCR counters of the SAS expander.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figure(s) in which.

DETAILED DESCRIPTION OF THE INVENTION

Figure 1:
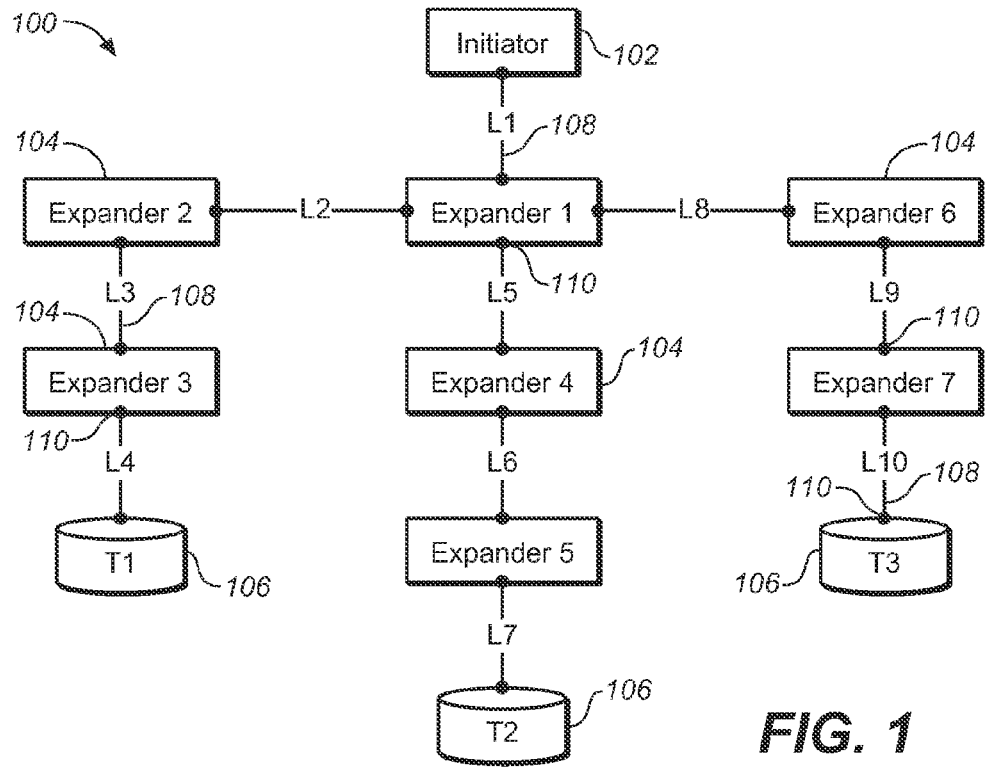
FIG. 1 is a block diagram illustration of a SAS domain via which the SAS discovery methods of the present disclosure may be implemented, in accordance with exemplary embodiments of the present disclosure.

Reference will now be made in detail to the presently preferred embodiments of the invention, examples of which are illustrated in the accompanying drawings.

Serial Attached Small Computer System Interface (SAS) discovery is based on a BROADCAST (CHANGE) primitive being sent by an expander every time a status of a SAS PHY or SAS link for that expander changes. These SAS PHY status changes and/or SAS link status changes may occur when end devices or expanders are powered on, when end devices or expanders are added/removed, and/or when link rates change. When a SAS PHY status change or a SAS link status change occurs for an expander of a SAS domain, a BROADCAST (CHANGE) primitive may be sent by that expander to every initiator within the SAS domain and to every other expander within the SAS domain. When any initiators and/or self-configuring expanders of the SAS domain receive the BROADCAST (CHANGE) primitive, a discovery process (ex.—SAS discovery) process may begin in an attempt to locate the PHY(s) within the SAS domain that have undergone a status change. Based upon the results of the discovery process, the initiators and self-configuring expanders may adjust their own configurations accordingly. For instance, the self-configuring expanders may update their own routing tables, while the initiator(s) may inform their operating system counter or RAID stack host counterparts of the status change(s).

Currently, when an initiator or self-configuring expander receives a BROADCAST (CHANGE) primitive, SAS discovery requires that each initiator and self-configuring expander check all expanders (or in the case of a self-configuring expander, all of the other expanders) within the SAS domain for any and all changes (ex.—status change(s), PHY changes, link changes) which may have occurred. For example, the initiator(s) and self-configuring expander(s) may check expanders within the SAS domain by sending Serial Management Protocol (SMP) DISCOVER Requests to the expanders. With current SAS discovery methods (and current SAS discovery algorithm(s)), all pathways of the SAS domain are checked for the status changes. This may be very inefficient since the SAS domain may have a lot of pathways and only a small subset of those pathways may actually be affected by the change(s). In larger SAS domains, the above-referenced inefficiency and unnecessary SAS discovery overhead of current SAS discovery methods is magnified, and may cause system problems and disruptive latencies. The embodiments of the present disclosure describe SAS discovery methods in which information (ex.—SMP requests and/or SMP responses) may be exchanged between: 1) initiator(s) and expanders of the SAS domain; and/or 2) between self-configuring expanders and other expanders (ex.—target expanders) within the SAS domain during discovery operations that specifies the PHYs of all expanders within the SAS domain that received one or more BROADCAST (CHANGE) primitives, which can be used to determine the specific pathway(s) and origin(s) of the BROADCAST (CHANGE) primitive(s), thereby eliminating any unnecessary pathway discovery operations (ex.—may eliminate discovery operations directed to pathways which are unaffected by the status change).

Referring to FIG. 1, a SAS system (ex.—SAS domain, SAS topology) in accordance with an exemplary embodiment of the present disclosure is shown. In exemplary embodiments of the present disclosure, the SAS system 100 may include one or more SAS discovery initiating node(s) 102. For instance, the SAS discovery initiating node(s) 102 may be initiator(s) 102 or self-configuring expander(s) 102. In further embodiments of the present disclosure, the SAS system 100 may include a plurality of expanders 104, said plurality of expanders 104 being connected to (ex.—communicatively coupled with) the node(s) 102. In still further embodiments of the present disclosure, the SAS system 100 may include a plurality of target devices 106 (ex.—SAS target devices 106), the plurality of target devices 106 being connected to (ex.—communicatively coupled with) the plurality of expanders 104, the plurality of target devices 106 also being connected to (ex.—communicatively coupled with) the node(s) 102 (ex.—initiator(s) 102) via the plurality of expanders 104.

In further embodiments of the present disclosure, the node(s) 102, the plurality of expanders 104 and the target devices 106 may be communicatively coupled via a plurality of links 108 (ex.—L1, L2, L3, L4, L5, L6, L7, L8, L9 and L10, as shown in FIG. 1). For example, the plurality of links 108 (ex.—lanes) may be point-to-point serial connections provided by SAS cables. In still further embodiments of the present disclosure, each target device 106 included in the plurality of target devices 106, each expander 104 included in the plurality of expanders 104, and each node 102 may include one or more PHYs 110 (ex.—one or more SAS PHYs 110). In exemplary embodiments of the present disclosure, each PHY 110 may contain a transmitter device and a receiver device and may serve as an endpoint in a point-to-point connection which is connected by a link 108. For example, each PHY 110 may be configured for electrically interfacing to a link 108 to communicate with another PHY 110 at the opposite end of said link 108. In further embodiments of the present disclosure, each link 108 may include two differential signal pairs, one in each direction. As mentioned above, each target device 106, each expander 104, and each discovery initiating node 102 may include one or more PHYs 110. In still further embodiments of the present disclosure, each SAS device (ex.—target device 106, expander 104 and/or discovery initiating node 102) may include one or more ports, said one or more ports each including one or more PHYs 110 (ex.—SAS PHYs 110) of the SAS device.

In current exemplary embodiments of the present disclosure, the target devices 106 may be storage devices, such as disk drives, which are configured to receive commands from the discovery initiating node 102. In further embodiments of the present disclosure, the discovery initiating node 102 may be a SAS host bus adapter in a host computer, or a SAS Input/Output (I/O) controller in a Redundant Array of Inexpensive Disks (RAID) controller. In still further embodiments of the present disclosure, the expanders 104 (ex.—SAS expanders 104) may be configured for facilitating connection of the plurality of target devices 106 to a single discovery initiating node 102 (as shown in FIG. 1). For example, the SAS expanders 104 may be configured for performing switch-like functions, such as routing, to enable SAS initiators 102 and target devices 106 to communicate via the SAS point-to-point connections (ex.—SAS links 108). In further embodiments of the present disclosure, one or more of the expanders 104 may be a self-configuring expander 104.

In exemplary embodiments of the present disclosure, each expander 104 may be configured for detecting when a change (ex.—status change) occurs with a SAS PHY 110 and/or SAS link 108 for that expander 104. For example, these SAS PHY status changes and/or SAS link status changes may occur when end devices (ex.—target devices 106) of the SAS domain 100 or expanders 104 of the SAS domain 100 are powered on, when end devices or expanders 104 are added to/removed from the SAS domain, and/or when link rates change. In exemplary embodiments of the present disclosure, when a first expander 104 of the plurality of expanders 104 detects such status change(s) for one of its SAS PHYs 110 or SAS links 108, the first expander 104 may be configured for transmitting a BROADCAST (CHANGE) primitive to each of the other expanders 104 included in the plurality of expanders 104, and also to the SAS discovery initiating node(s) 102. When a SAS discovery initiating node 102, such as an initiator 102 or a self-configuring expander 102, receives the BROADCAST (CHANGE) primitive, the SAS discovery initiating node 102 may initiate a discovery process (ex.—a SAS discovery process) in an attempt to locate the SAS PHY(s) 110 and/or SAS link(s) 108 within the SAS domain 100 which underwent the status change(s). Based upon the results of the discovery process, the SAS discovery initiating node(s) 102 (exs.—initiator(s) 102, self-configuring expander(s) 102 may be configured to adjust their own configurations accordingly. For instance, the self-configuring expanders 102 may update their own routing tables, while the initiators 102 may inform their operating system counter or RAID stack host counterparts of the status change(s).

Figure 2:
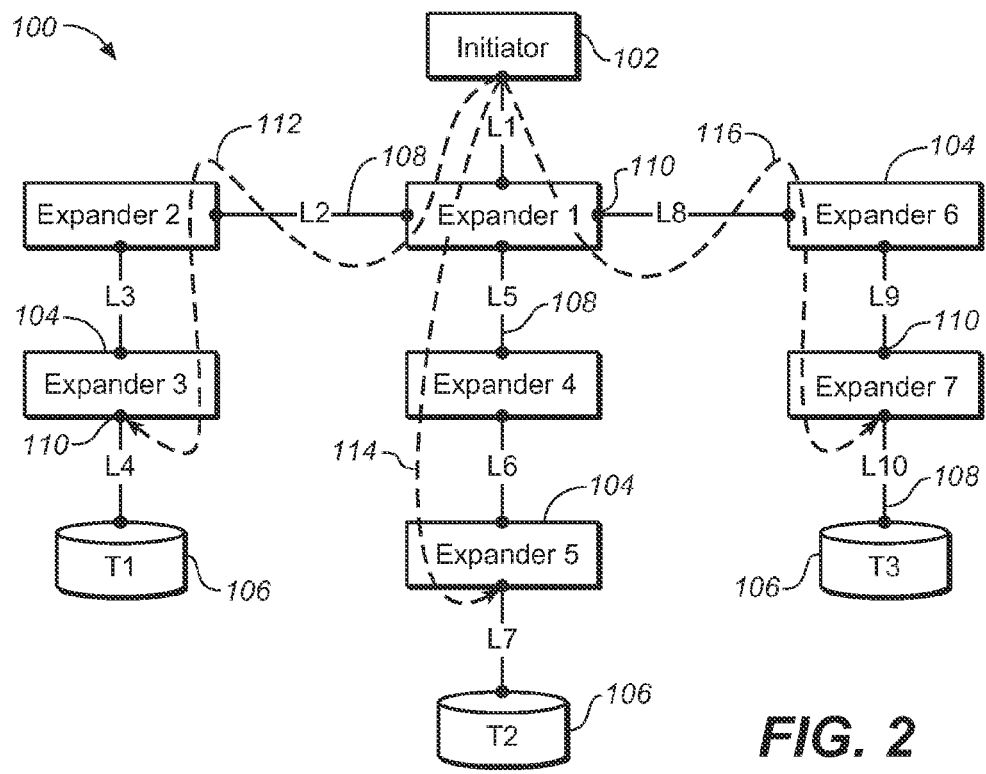
FIG. 2 is a block diagram illustration of the SAS domain shown in FIG. 1, wherein a first SMP DISCOVER Request is shown as being transmitted from a SAS discovery initiating node of the SAS domain along each of the multiple pathways of the SAS domain to each expander of the SAS domain, in accordance with an exemplary embodiment of the present disclosure.
Figure 3:
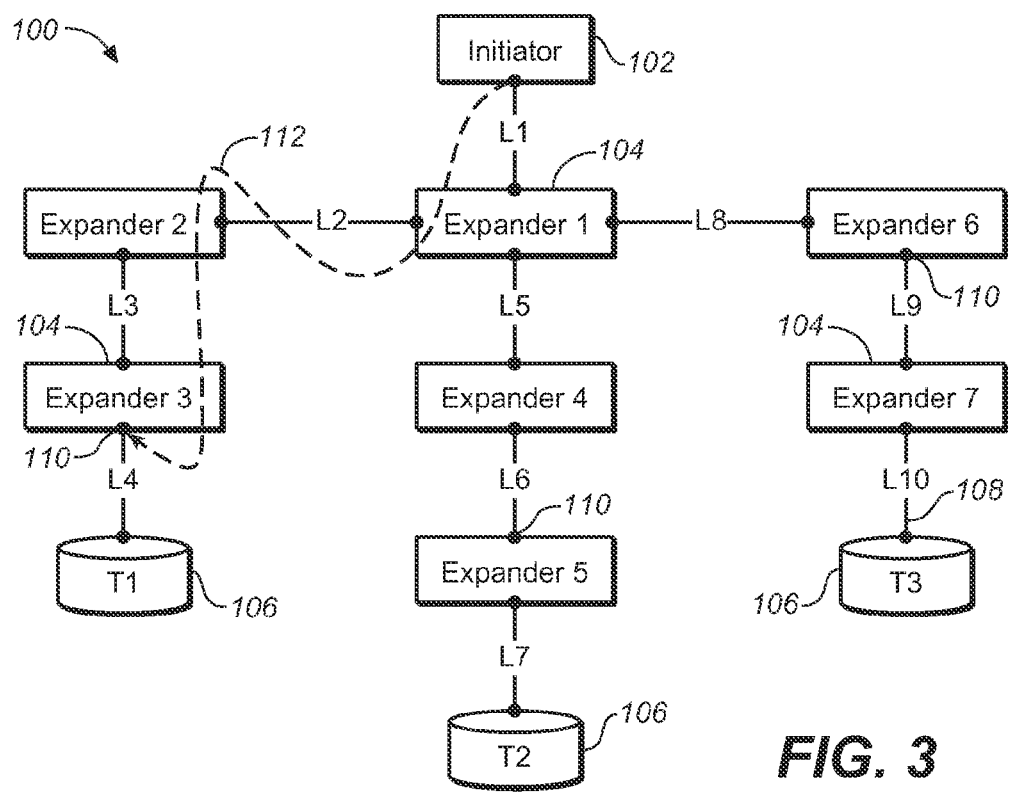
FIG. 3 is a block diagram illustration of the SAS domain shown in FIG. 1, wherein a subsequent (second) SMP DISCOVER Request is shown as being transmitted from the SAS discovery initiating node along only one of the multiple pathways, said second SMP DISCOVER Request being selectively transmitted based upon comparison by the SAS discovery initiating node of stored BCR counts with BCR counts (ex—BCR count information, BCR count data) it received in SMP DISCOVER Responses responsive to the first SMP DISCOVER Request.
Figure 4:
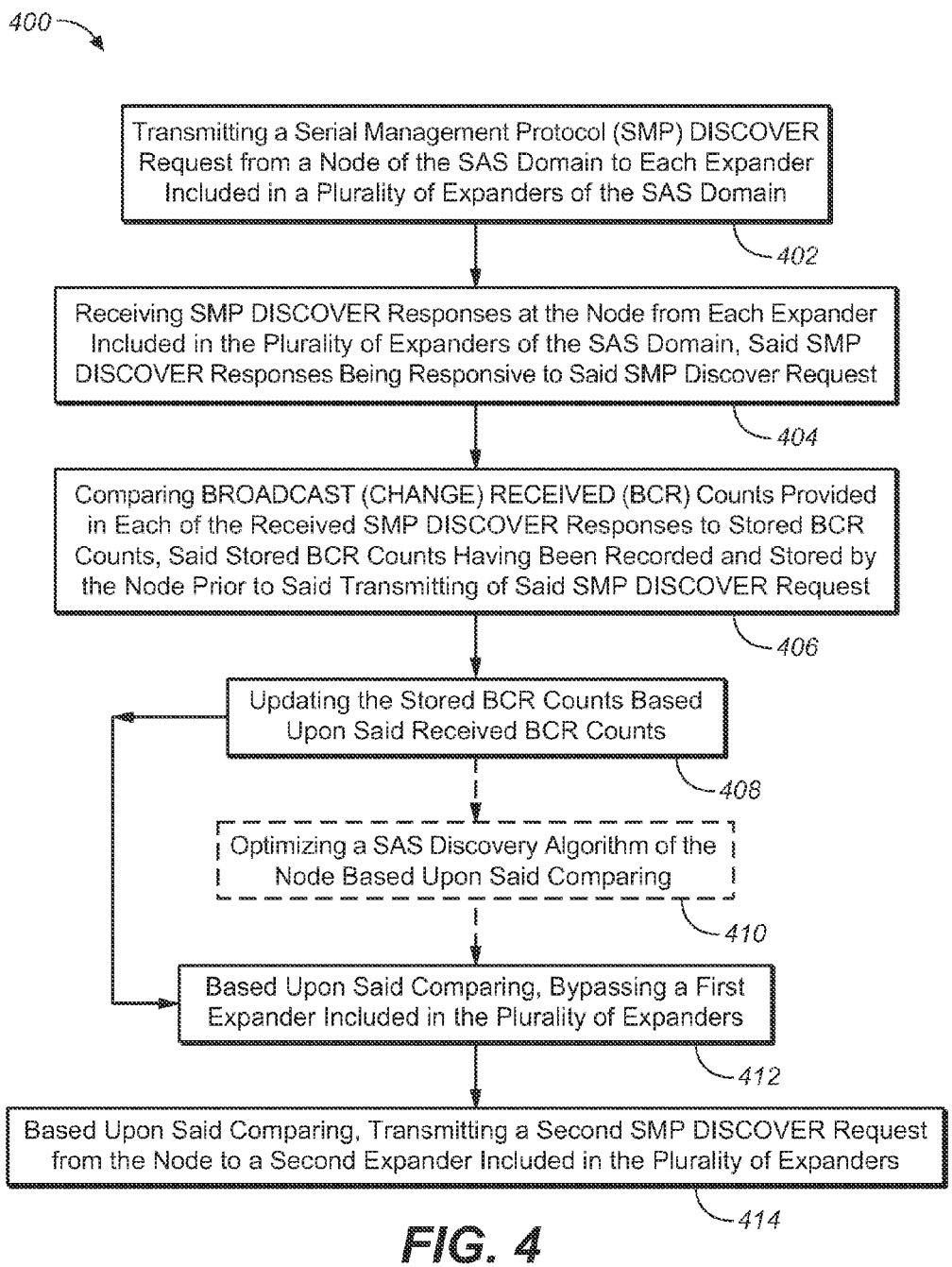
FIG. 4 is a flowchart illustrating a method for performing SAS discovery in a SAS domain, such as the SAS domain shown in FIG. 1, in accordance with an exemplary embodiment of the present disclosure.

FIG. 4 is a flowchart which illustrates a method for performing SAS discovery via the SAS system 100 (ex.—SAS domain 100) shown in FIG. 1, in accordance with an exemplary embodiment of the present disclosure. The method 400 includes the step of transmitting a SMP DISCOVER Request from a node of the SAS domain to each expander included in a plurality of expanders of the SAS domain 402. As mentioned above, after detecting a status change(s) for one or more of its own SAS PHYs 110 or SAS links 108, a first expander 104 included in the plurality of expanders 104 may be configured for transmitting a BROADCAST (CHANGE) primitive to each of the other expanders 104 included in the plurality of expanders 104, and also to the SAS discovery initiating node(s) 102. In the exemplary illustrated embodiment, as shown in FIGS. 1-3, the first expander 104 (shown as "Expander 3" in the FIGS. 1-3) may detect a status change having occurred within one or more of its SAS PHY(s) 110 and/or SAS link(s) and may transmit a BROADCAST (CHANGE) primitive to each of the other expanders 104 included in the plurality of expanders 104, and also to the SAS discovery initiating node(s) 102 (shown as "Initiator" in FIGS. 1-3). As mentioned above, after receiving the BROADCAST (CHANGE) primitive, the SAS discovery initiating node 102 may initiate a SAS discovery process in an attempt to locate which SAS PHY(s) 110 and/or SAS link(s) 108 underwent said status change(s). The SAS discovery initiating node 102 may do this by transmitting a SMP DISCOVER Request to each expander 104 included in the plurality of expanders 104 of the SAS domain 100.

In further embodiments of the present disclosure, the method 400 may further include the step of receiving SMP DISCOVER Responses at the node from each expander included in the plurality of expanders of the SAS domain, said SMP DISCOVER Responses being responsive to said SMP DISCOVER Request 404. For example, after receiving the SMP DISCOVER Request from the SAS discovery initiating node 102, each expander 104 included in the plurality of expanders 104 may transmit its own unique SMP DISCOVER Response to the SAS discovery initiating node 102, said SAS discovery initiating node 102 being configured for receiving said SMP DISCOVER Responses, said SMP DISCOVER Responses being responsive to said SMP DISCOVER Request. As mentioned above, after detecting a status change(s) for one or more of its own SAS PHYs 110 or SAS links 108, a first expander 104 included in the plurality of expanders 104 may be configured for transmitting a BROADCAST (CHANGE) primitive to each of the other expanders 104 included in the plurality of expanders 104, and also to the SAS discovery initiating node(s) 102. As mentioned above, in the exemplary illustrated embodiment, as shown in FIGS. 1-3, the first expander 104 (shown as "Expander 3" in the FIGS. 1-3) may detect a status change having occurred within one or more of its SAS PHY(s) 110 and/or SAS link(s) and may transmit a BROADCAST (CHANGE) primitive to each of the other expanders 104 included in the plurality of expanders 104, and also to the SAS discovery initiating node(s) 102 (shown as "Initiator" in FIGS. 1-3). Each expander 104 included in the plurality of expanders 104 may be configured for tracking and recording: a) when it receives a BROADCAST (CHANGE) primitive(s) from a remote device(s)/other device(s) (ex.—other expander(s) 104) of the SAS domain; b) the number of BROADCAST (CHANGE) primitive(s) received from said remote device(s); and c) which of its PHYs 110 have received the BROADCAST (CHANGE) primitive(s) from said remote devices. In further embodiments, each expander 104 may implement one or more counters (ex.—wrapping counters), which may be called BROADCAST (CHANGE) RECEIVED (BCR) counters for recording and tracking, on a per-PHY-basis, the above-mentioned information regarding BROADCAST (CHANGE) primitives. For example, each expander 104 may include a separate counter for each of its PHYs 110 for tracking the above-mentioned information regarding BROADCAST (CHANGE) primitives. In still further embodiments, each expander 104 increments (ex.—by 1 for each BROADCAST (CHANGE) primitive received) its own BCR counter(s) when one of the PHYs 110 of that expander 104 receives a BROADCAST (CHANGE) primitive from a remote device (ex.—another expander 104) of the SAS domain 100, but does not increment its BCR counter(s) when a first one of its PHYs 110 receives a BROADCAST (CHANGE) primitive which has been forwarded from a second one of its PHYs 110. In the illustrated embodiment, since "Expander 3" was the source (ex.—originator) of the BROADCAST (CHANGE) primitive which was transmitted to all of the other expanders 104 of the domain 100, and did not receive that BROADCAST (CHANGE) primitive, "Expander 3" would not increment its counter in that instance. However, each of the other expanders 104 of the domain 100 would increment their counters. In further embodiments of the present disclosure, the counters may be 16-bit or 32-bit counters.

As mentioned above, after receiving the SMP DISCOVER Request from the SAS discovery initiating node 102, each expander 104 included in the plurality of expanders 104 may transmit its own unique SMP DISCOVER Response to the SAS discovery initiating node 102, said SMP DISCOVER Responses being responsive to said SMP DISCOVER Request. In exemplary embodiments of the present disclosure, each expander 104 may include within its own unique SMP DISCOVER Response, its BCR counter, BCR counter information and/or BCR count information (ex.—BCR count). The BCR count information (ex.—BCR count) may indicate which PHYs 110 of that expander 104 have received BROADCAST (CHANGE) primitives and/or how many BROADCAST (CHANGE) primitives have been received by each PHY 110 of that expander 104. Further, as mentioned above, said SAS discovery initiating node(s) 102 being configured for receiving said SMP DISCOVER Responses, including the BCR counts for each expander 104 of the domain 100. In still further embodiments of the present disclosure, each SAS discovery initiating node 102 is configured for recording, tracking and/or monitoring the BCR count for every PHY 110 of the SAS domain 100.

In exemplary embodiments of the present disclosure, the method 400 may further include the step of comparing BCR counts provided in each of the received SMP DISCOVER Responses to stored BCR counts, said stored BCR counts having been recorded and stored by the node prior to said transmitting of said SMP DISCOVER Request 406. For example, when the SAS discovery initiating node 102 receives the SMP DISCOVER Responses from each of the expanders 104 of the domain 100, the SAS discovery node 102 may compare the BCR counts for the expanders 104 (which were received in the SMP DISCOVER Responses) with previously recorded BCR counts for the expanders 104 (said previously recorded BCR counts for the expanders 104 having been previously recorded and/or stored by the SAS discovery initiating node 102). Based upon the comparison, the SAS discovery initiating node 102 may be configured for quickly determining which PHYs of which expanders 104 received the BROADCAST (CHANGE) primitive which was transmitted. For instance, in the illustrated embodiment, since "Expander 3" was the source (ex.—originator) of the BROADCAST (CHANGE) primitive which was transmitted to all of the other expanders 104 of the domain 100, and did not receive that BROADCAST (CHANGE) primitive, the SAS discovery initiating node 102 would be able to determine through said comparing that the BCR count for "Expander 3" would not have changed since the last BCR count for "Expander 3" was recorded by the discovery initiating node 102. Thus, the discovery initiating node 102 would be able to determine that "Expander 3" had not received the most recently transmitted BROADCAST (CHANGE) primitive. Using such information, the discovery initiating node 102 is able to deterministically (ex.—selectively) send or direct further or subsequent SAS discovery traffic (subsequent SMP DISCOVER Requests) via selected pathways (exs.—to selected expanders 104, along selected links 108) of the domain for more efficiently determining which PHY(s) 110, expander(s) 104 and/or pathways have been affected by the most recent status change(s). This allows for a reduction of SAS discovery traffic, so that rather than directing additional or subsequent SAS discovery requests to each of the expanders 104 and/or along all pathways (112, 114, 116) of the domain 100, the SAS discovery initiating node 102 may send such traffic to selected expanders 104 of the domain 100, thereby alleviating and/or preventing the potential latency problems which are associated with current SAS domains. The illustrated embodiment shown in FIG. 2 shows the initial SMP DISCOVER Requests being directed to all of the expanders 104 of the domain (ex.—along three separate pathways). As mentioned above, using the information derived from said comparing of BCR counts, the SAS discovery initiating node 102 (exs.—initiator 102, self-configuring expander 102) may determine that the status change has affected "Expander 3", thus, the SAS discovery initiating node 102 may focus, narrow and/or selectively direct subsequent SAS discovery traffic (ex.—a subsequent SMP DISCOVER Request) along a single (ex.—first) pathway 112 (as shown in FIG. 3) which provides said subsequent SMP DISCOVER Request to "Expander 3". For example, subsequent SAS discovery traffic may be provided (ex.—routed) to "Expander 3" via "Expander 1" and "Expander 2" along links L1, L2 and L3.

In further embodiments of the present disclosure, the method 400 further includes the step of updating the stored BCR counts based upon said received BCR counts 408. As mentioned above, each SAS discovery initiating node 102 may be configured for tracking and/or recording the BCR count for each PHY 110 of the SAS domain 100. Upon comparing the newly received BCR counts with its previously recorded BCR counts for the PHYs 110 of the SAS domain 100, the SAS discovery initiating node 102 is configured for updating its stored BCR counts (ex.—stored BCR count table) based upon said comparison with the newly received BCR counts.

In exemplary embodiments of the present disclosure, the method 400 may further include the step of optimizing an SAS discovery algorithm of the node based upon said comparing 410. In further embodiments, the method 400 may further include the step of, based upon said comparing, bypassing a first expander included in the plurality of expanders 412. In exemplary embodiments, after comparing the newly received BCR counts to the previously stored BCR counts, the SAS discovery initiating node 102 may be configured for de-selecting or bypassing one or more expanders 104 of the domain 100. As mentioned above, in the illustrated embodiment, the SAS discovery initiating node 102 may be configured for determining, based upon said comparing, that the most recent status change has affected "Expander 3" and not any of the other expanders 104 of the domain 100, and that subsequent SMP DISCOVER Request(s) need to be directed along only the first pathway 112 of the domain 100 to "Expander 3", but not along the second and third pathways (114, 116) of the domain. The SAS discovery initiating node 102 then optimizes its SAS discovery algorithm accordingly. By making a determination that subsequent SMP DISCOVER Request(s) are not be directed along the second and third pathways (114, 116), the SAS discovery initiating node 102 effectively bypasses expanders 104 of the domain 100 which are located along those pathways (114, 116).

In further embodiments of the present disclosure, the method 400 may further include the step of, based upon said comparing, transmitting a second SMP DISCOVER Request from the node to a second expander included in the plurality of expanders 414. As mentioned above, based upon said comparing, the SAS discovery initiating node 102 may be configured for determining that a subsequent (ex.—follow-up) SMP DISCOVER Request is to be transmitted to one or more selected expanders 104 included in the plurality of expanders 104 for obtaining more information regarding the recent status change. For example, as shown in FIG. 3, after determining, based upon said comparing, that the most recent status change has affected "Expander 3" and not any of the other expanders 104 of the domain 100, the subsequent SMP DISCOVER Request(s) may be directed (transmitted by the SAS discovery initiating node 102) along only the first pathway 112 of the domain 100 to "Expander 3".

Figure 5:
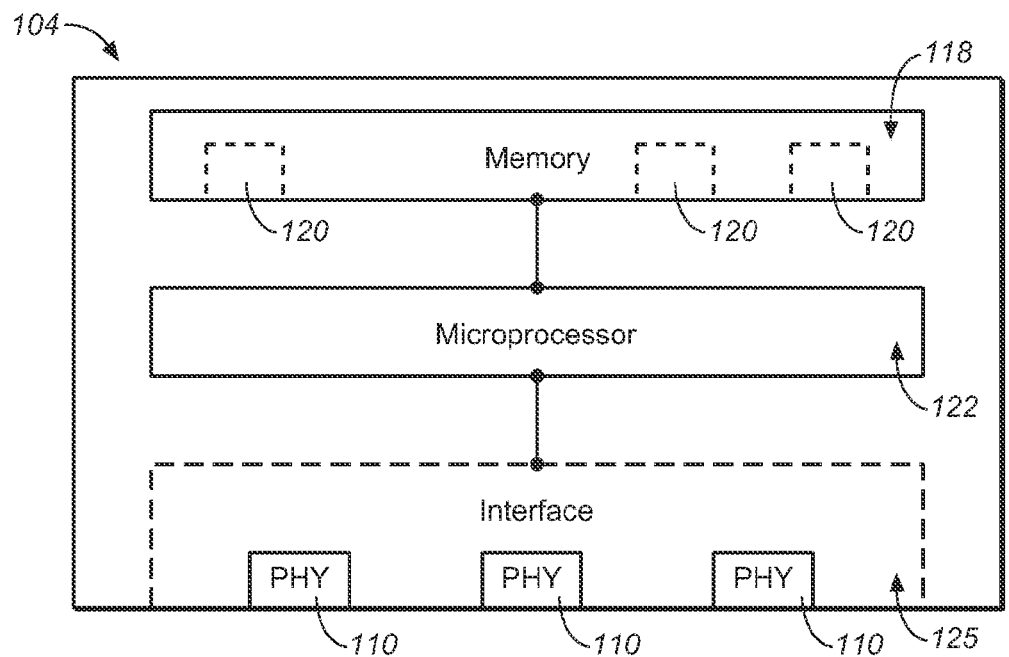
FIG. 5 is a block diagram illustration of a SAS expander configured for implementation in a SAS domain, such as the SAS domain shown in FIG. 1, in accordance with an exemplary embodiment of the present disclosure.

FIG. 5 illustrates a SAS expander 104 in accordance with an exemplary embodiment of the present disclosure. The SAS expander 104 may include an interface 125, said interface 125 configured for connecting the expander to a plurality of SAS devices of a SAS domain, said interface 125 including a plurality of SAS PHYs 110. The SAS expander 104 may further include a memory 118, said memory 118 configured for storing a plurality of BCR counters 120 of the SAS expander 104, each BCR counter 120 included in the plurality of BCR counters 120 corresponding to a SAS PHY 110 included in the plurality of SAS PHYs 110, each BCR counter 120 configured for indicating a number of BROADCAST (CHANGE) primitives received by its corresponding SAS PHY 110. The SAS expander 104 may further include a microprocessor 122. The microprocessor 122 may be connected to the memory 118 and to the interface 125, said microprocessor 122 configured for monitoring when a BROADCAST (CHANGE) primitive is received by a SAS PHY 110 included in the plurality of SAS PHYs 110 of the SAS expander 104, said microprocessor 122 further configured for recording in the plurality of BCR counters 120 a number of BROADCAST (CHANGE) primitives received by each of the corresponding SAS PHYs 110 of the SAS expander 104. In further embodiments of the present disclosure, the microprocessor 122 may cause the counters 120 to be incremented by one for each BROADCAST (CHANGE) primitive received by their corresponding PHYs 110. In still further embodiments, the microprocessor 122 is configured for receiving, via the interface 125, a SMP DISCOVER Request from a SAS discovery initiating node 102 of the SAS domain 100. In further embodiments, the microprocessor 122 is configured for causing the SAS expander 104 to transmit to the SAS discovery initiating node 102, via the interface 125, a SMP DISCOVER Response, said SMP DISCOVER Response being responsive to the SMP DISCOVER Request, said SMP DISCOVER Response including BCR counts of each of the BCR counters of the SAS expander.

Figure 6:
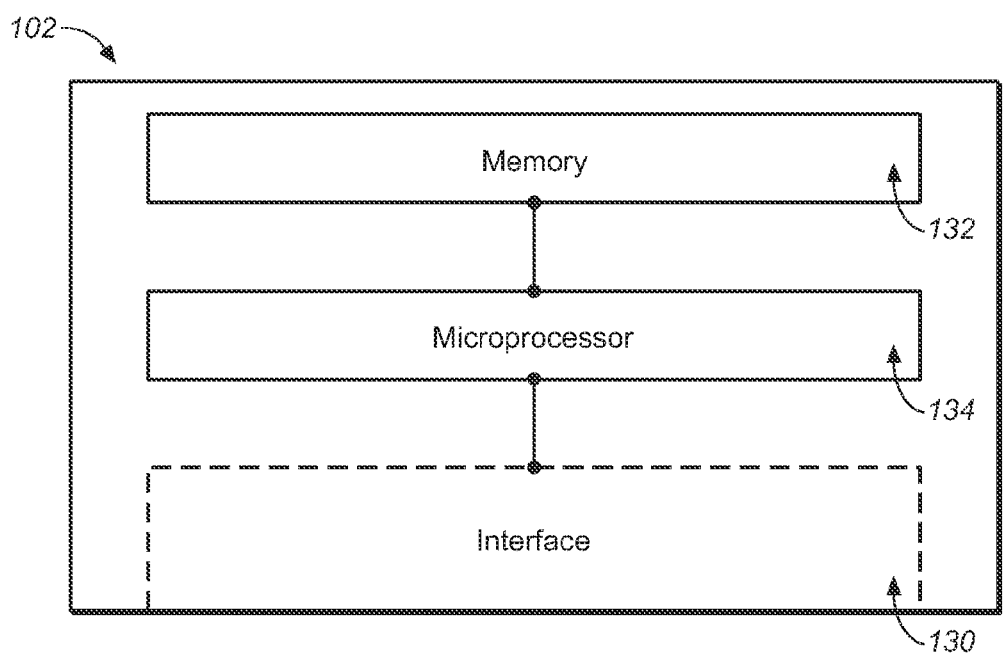
FIG. 6 is a block diagram illustration of a SAS discovery initiating node configured for implementation in a SAS domain, such as the SAS domain shown in FIG. 1, in accordance with an exemplary embodiment of the present disclosure.

FIG. 6 illustrates the SAS discovery initiating node 102 (exs.—initiator 102, self-configuring expander 102) in accordance with an exemplary embodiment of the present disclosure. The SAS discovery initiating node 102 may include an interface 130, said interface 130 being configured for communicatively coupling the node 102 to the plurality of expanders 104 of the SAS domain 100. The SAS discovery initiating node 102 may further include a memory 132, said memory 132 configured for storing a plurality of BCR counts for each PHY 110 of each expander 104 of the SAS domain 100. The SAS discovery initiating node 102 may further include a microprocessor 134, said microprocessor 134 being connected to the memory 132 and the interface 130. The microprocessor 134 is configured for causing the node 102 to transmit a first SMP DISCOVER Request to each expander 104 included in the plurality of expanders 104 of the SAS domain 100 when a BROADCAST (CHANGE) primitive is received by the node 102 from an expander 104 included in the plurality of expanders 104 of the SAS domain 100. The node 102 is further configured for receiving, via the interface 130, a plurality of SMP DISCOVER Responses, said plurality of SMP DISCOVER Responses being transmitted from each of the expanders 104 of the SAS domain 100, said SMP DISCOVER Responses being responsive to said first SMP DISCOVER Request. The node 102 is further configured for comparing BCR counts provided in each of the received SMP DISCOVER Responses to the stored BCR counts, said stored BCR counts having been recorded and stored by the node 102 prior to said transmitting of said first SMP DISCOVER Request. Further, the node 102 may be configured for updating the stored BCR counts based upon said received BCR counts. In further embodiments, the node 102 is configured for optimizing an SAS discovery algorithm of the node 102 based upon said comparing of the received BCR counts to the previously recorded BCR counts. Further, based upon said comparing, said node 102 is configured for bypassing a first expander 104 included in the plurality of expanders 104. Further, based upon said comparing, said node 102 is configured for selectively transmitting a second SMP DISCOVER Request to a second expander 104 included in the plurality of expanders 104.

The method(s) disclosed herein allow for pathway prediction which may promote improved reliability and performance as SAS domains scale to very large domains. This is important for notification of the rest of the system as SAS end devices are added and/or removed and errors occur. Further, the method(s) disclosed herein may minimize the effect of bad (ex.—faulty) devices on the rest of the system which pertains to Denial of Service attacks.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium/computer-readable storage medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for performing Serial Attached Small Computer System Interface (SAS) discovery in a SAS domain, said method comprising:
    transmitting a Serial Management Protocol (SMP) DISCOVER Request from a node of the SAS domain to each expander included in a plurality of expanders of the SAS domain;
    receiving SMP DISCOVER Responses at the node from each expander included in the plurality of expanders of the SAS domain, said SMP DISCOVER Responses being responsive to said SMP DISCOVER Request;
    comparing BROADCAST (CHANGE) RECEIVED (BCR) counts provided in each of the received SMP DISCOVER Responses to stored BCR counts, said stored BCR counts having been recorded and stored by the node prior to said transmitting of said SMP DISCOVER Request; and
    updating the stored BCR counts based upon said received BCR counts.

2. A method for performing SAS discovery as claimed in claim 1, said method further comprising:
    optimizing an SAS discovery algorithm of the node based upon said comparing.

3. A method for performing SAS discovery as claimed in claim 1, said method further comprising:
    based upon said comparing, bypassing a first expander included in the plurality of expanders.

4. A method for performing SAS discovery as claimed in claim 3, said method further comprising:
    based upon said comparing, transmitting a second SMP DISCOVER Request from the node to a second expander included in the plurality of expanders.

5. A method for performing SAS discovery as claimed in claim 1, wherein said node is one of: an initiator and a self-configuring expander.

6. A method for performing SAS discovery as claimed in claim 1, wherein the BCR counts provided in the received SMP DISCOVER Responses indicate a number of BROADCAST (CHANGE) primitives received by each PHY of the expanders.

7. A method for performing SAS discovery as claimed in claim 1, wherein each expander increments its BCR count upon receiving a BROADCAST (CHANGE) primitive from a remote device of the SAS domain.

8. A non-transitory, computer-readable medium having computer-executable instructions for performing a method for Serial Attached Small Computer System Interface (SAS) discovery in a SAS domain, said method comprising:
    transmitting a Serial Management Protocol (SMP) DISCOVER Request from a node of the SAS domain to each expander included in a plurality of expanders of the SAS domain;
    receiving SMP DISCOVER Responses at the node from each expander included in the plurality of expanders of the SAS domain, said SMP DISCOVER Responses being responsive to said SMP DISCOVER Request;
    comparing BROADCAST (CHANGE) RECEIVED (BCR) counts provided in each of the received SMP DISCOVER Responses to stored BCR counts, said stored BCR counts having been recorded and stored by the node prior to said transmitting of said SMP DISCOVER Request; and
    updating the stored BCR counts based upon said received BCR counts.

9. A non-transitory, computer-readable medium having computer-executable instructions for performing a method as claimed in claim 8, said method further comprising:
    optimizing an SAS discovery algorithm of the node based upon said comparing.

10. A non-transitory, computer-readable medium having computer-executable instructions for performing a method as claimed in claim 9, said method further comprising:
    based upon said comparing, bypassing a first expander included in the plurality of expanders.

11. A non-transitory, computer-readable medium having computer-executable instructions for performing a method as claimed in claim 10, said method further comprising:
    based upon said comparing, transmitting a second SMP DISCOVER Request from the node to a second expander included in the plurality of expanders.

12. A non-transitory, computer-readable medium having computer-executable instructions for performing a method as claimed in claim 8, wherein said node is one of: an initiator and a self-configuring expander.

13. A non-transitory, computer-readable medium having computer-executable instructions for performing a method as claimed in claim 8, wherein the BCR counts provided in the received SMP DISCOVER Responses indicate a number of BROADCAST (CHANGE) primitives received by each PHY of the expanders.

14. A non-transitory, computer-readable medium having computer-executable instructions for performing a method as claimed in claim 8, wherein each expander increments its BCR count upon receiving a BROADCAST (CHANGE) primitive from a remote device of the SAS domain.

15. A Serial Attached Small Computer System Interface (SAS) discovery initiating node of a SAS domain, said node comprising:
- an interface, said interface configured for communicatively coupling the node to a plurality of expanders of the SAS domain;
- a memory, said memory configured for storing a plurality of BROADCAST (CHANGE) RECEIVED (BCR) counts; and
- a microprocessor, said microprocessor being connected to the memory and the interface, said microprocessor configured for causing the node to transmit a first Serial Management Protocol (SMP) DISCOVER Request to each expander included in the plurality of expanders of the SAS domain when a BROADCAST (CHANGE) primitive is received by the node from an expander included in a plurality of expanders of the SAS domain, said node being further configured for receiving, via the interface, a plurality of SMP DISCOVER Responses, said plurality of SMP DISCOVER Responses being sent from the plurality of expanders of the SAS domain, said SMP DISCOVER Responses being responsive to said first SMP DISCOVER Request, said node being further configured for comparing BCR counts provided in each of the received SMP DISCOVER Responses to the stored BCR counts, said stored BCR counts having been recorded and stored by the node prior to said transmitting of said first SMP DISCOVER Request,
- wherein said node updates the stored BCR counts based upon said received BCR counts.

16. A SAS discovery initiating node of a SAS domain as claimed in claim 15, wherein said node is configured for optimizing an SAS discovery algorithm of the node based upon said comparing of the received BCR counts to the previously recorded BCR counts.

17. A node of a SAS domain as claimed in claim 16, wherein, based upon said comparing, said node is configured for bypassing a first expander included in the plurality of expanders.

18. A SAS discovery initiating node of a SAS domain as claimed in claim 17, wherein, based upon said comparing, said node is configured for transmitting a second SMP DISCOVER Request to a second expander included in the plurality of expanders.

19. A SAS discovery initiating node of a SAS domain as claimed in claim 15, wherein said node is one of: an initiator and a self-configuring expander.

20. A SAS discovery initiating node of a SAS domain as claimed in claim 15, wherein the BCR counts provided in the received SMP DISCOVER Responses indicate a number of BROADCAST (CHANGE) primitives received by each PHY of the expanders.

21. A SAS discovery initiating node of a SAS domain as claimed in claim 15, wherein each expander increments its BCR count upon receiving a BROADCAST (CHANGE) primitive from a remote device of the SAS domain.

22. A Serial Attached Small Computer System Interface (SAS) expander, comprising:
- an interface, said interface configured for connecting the expander to a plurality of SAS devices of a SAS domain, said interface including a plurality of SAS PHYs;
- a memory, said memory configured for storing a plurality of BROADCAST (CHANGE) RECEIVED (BCR) counters of the SAS expander, each BCR counter included in the plurality of BCR counters corresponding to a SAS PHY included in the plurality of SAS PHYs, each BCR counter configured for indicating a number of BROADCAST (CHANGE) primitives received by its corresponding SAS PHY; and
- a microprocessor, said microprocessor being connected to the memory and to the interface, said microprocessor configured for monitoring when a BROADCAST (CHANGE) primitive is received by a SAS PHY included in the plurality of SAS PHYs of the SAS expander, said microprocessor further configured for recording in the plurality of BCR counters a number of BROADCAST (CHANGE) primitives received by each of the corresponding SAS PHYs of the SAS expander, said microprocessor causing said counters to be incremented by one for each BROADCAST (CHANGE) primitive received by their corresponding PHYs, said microprocessor configured for receiving, via the interface, a Serial Management Protocol (SMP) DISCOVER Request transmitted by a SAS discovery initiating node included in the plurality of SAS devices of the SAS domain, said microprocessor further configured for causing the SAS expander to transmit to the SAS discovery initiating node, via the interface, a SMP DISCOVER Response responsive to said SMP DISCOVER Request,
- wherein said SMP DISCOVER Response includes BCR counts of each of the BCR counters of the SAS expander.

* * * * *